Nov. 24, 1942.        Z. H. BUSH        2,303,157
HEAT EXCHANGE DEVICE
Filed July 18, 1940         2 Sheets-Sheet 1
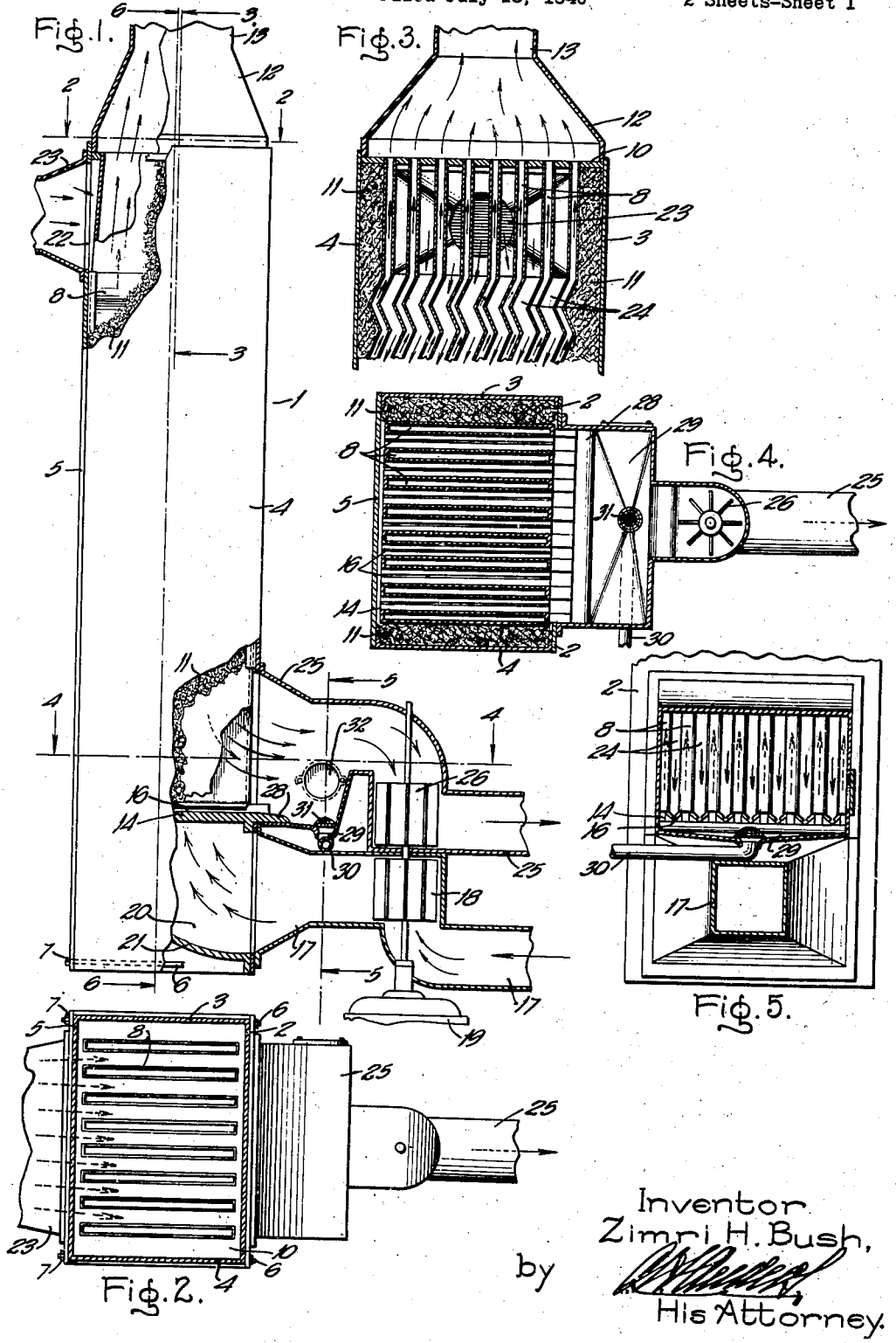
Inventor
Zimri H. Bush,
by
His Attorney.

Nov. 24, 1942.     Z. H. BUSH     2,303,157
HEAT EXCHANGE DEVICE
Filed July 18, 1940     2 Sheets-Sheet 2
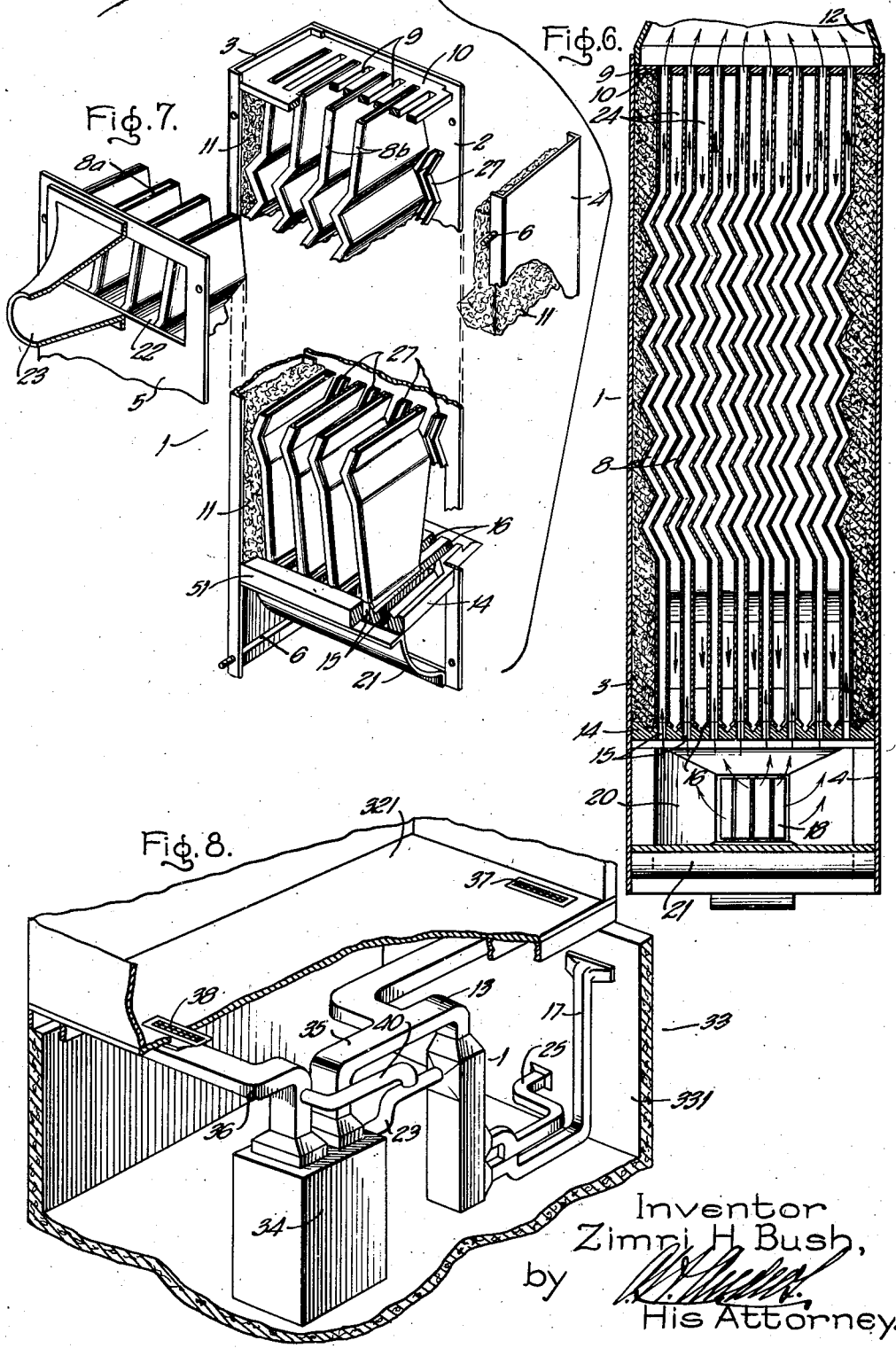
Inventor
Zimri H. Bush,
by
His Attorney.

Patented Nov. 24, 1942

2,303,157

UNITED STATES PATENT OFFICE 2,303,157

HEAT EXCHANGE DEVICE

Zimri H. Bush, Watertown, N. Y.

Application July 18, 1940, Serial No. 346,161

4 Claims. (Cl. 257—245)

More specifically, my invention relates to an air conditioning system which is particularly designed for house heating purposes, and a heat exchange device for use therein.

In house heating systems, it is desirable to circulate air between the heating plant and the rooms and, in so doing, to return cold air from the rooms to the heating plant, to reheat this air and to return it to the room while adding thereto heated fresh air. While adding heated fresh air to the air conditioning system, it is also desirable to remove at least to some extent the foul air from the air conditioning system.

It is, therefore, one object of my invention to provide a novel heat exchange device which is adapted to preheat fresh air before its introduction to the hot air delivery duct communicating with the heating plant of a building structure and the rooms thereof.

Heretofore, so far as I am aware heat exchange devices have been provided in which a plurality of ducts are formed through which air, to be heated, is passed in one direction and between which ducts products of combustion from the heating plant are passed in the opposite direction whereby to provide heat transfer through the walls of the ducts and a preheating of the air before its introduction to the rooms. In heat exchange devices of the foregoing character, the ducts, in some instances, provide a tortuous path for the flow of gases whereby to provide for high heat transfer efficiencies. However, it is practically impossible to clean the exteriors of these ducts where carbonaceous deposits from the products of combustion collect. Obviously, their heat transfer efficiencies are materially reduced by such accumulation of deposits.

It is, therefore, a further object of my invention to provide a heat exchange device comprising a plurality of narrow ducts defining passages for the flow of air therethrough and spaced to permit the flow of products of combustion therebetween; said device being characterized by the fact that a plurality of said ducts are removable from between others thereof whereby to facilitate cleaning of their exteriors. More particularly, an object of my invention lies in providing a heat exchange device comprising a casing within which a plurality of ducts extend, having a readily removable side wall, a plurality of the ducts being supported on the removable wall and the remaining ducts being supported on a second wall of the casing.

Other objects reside in providing a heat exchange device of the above character in which guide elements are provided relatively to position the ducts within the casing thereof when it is assembled; and a heat exchange device in which means is provided for removing condensate therefrom.

With these and other objects in view, my invention includes the novel heat exchange device therein, and the combinations of elements described below and illustrated in the accompanying drawings in which—

Fig. 1 is a fragmentary, elevation view partially broken away and in section of the heat exchange device of my invention;

Fig. 2 is a section thereof taken in about the plane 2—2 of Fig. 1;

Fig. 3 is a fragmentary, sectional elevation view taken in about the plane 3—3 of Fig. 1;

Fig. 4 is a sectional plan view taken in about the plane 4—4 of Fig. 1;

Fig. 5 is a fragmentary, sectional elevation view taken in about the plane 5—5 of Fig. 1;

Fig. 6 is a vertical section taken through the device of Fig. 1 in about the plane 6—6 thereof;

Fig. 7 is a perspective view of the heat exchange device, partially broken away and exploded to illustrate details of construction thereof; and Fig. 8 is a fragmentary view of a building structure illustrating my air condition system applied thereto.

Referring to Figs. 1 through 6 wherein I have illustrated the preferred embodiment of my heat exchange device, and particularly to Fig. 1, I indicates generally the casing thereof comprising the side walls 2, 3, 4 and 5. In accordance with my invention, at least one of the side walls of the device I is detachably fastened to the casing. To provide this construction, the side walls 3 and 4 may be flanged at their ends and provided with openings in the flanges through which stay bolts 6 may be passed, preferably adjacent the top and bottom of the casing. The walls 2 and 5 are likewise provided with openings adapted to register with the openings in the flanges of the side walls 3 and 4 through which the stay bolts may be passed and the walls may be secured together in casing-forming relation by means of nuts 7 threaded on the ends of the bolts 6. With this construction, the nuts 7 may be removed and the side wall 5 readily removed from the casing.

The casing is provided interiorly thereof with a plurality of preferably narrow ducts 8, the side walls of which are formed of fairly thin metal having high-heat-conductivity properties. These ducts, throughout the major portion of the lengths thereof, have an undulating configuration and preferably are provided with substantially V-shaped bends therein whereby to cause the air passing therethrough to follow a zigzag or undulating path. The upper ends of the ducts 8 enter and fit closely within slots 9 (see also Fig. 7) formed in a plate 10 forming an upper closure for the casing 1. Between the sides of the end ducts and the side walls 3 and 4 of the casing is preferably arranged heat insulating material as indicated at 11. A hood 12 communicating with a duct 13 is adapted to be fitted to the upper end of casing 1 and provides a path for the flow of heated air issuing from the ducts 8 to the hot-air delivery duct leading from the heating plant to the rooms to be heated.

The lower ends of the ducts 8 rest upon a partition 14 spaced above the bottom of the casing as illustrated in Fig. 6. The partition is provided with a plurality of slotted openings 15 therein which are adapted to register with the ducts 8. Between the slotted openings 15 therein, the upper surface of the partition 14 is preferably provided with grooves such as the V-shaped grooves indicated at 16. The upper edges of the sides of these grooves preferably terminate substantially at the openings 15 in the partition and the lower ends of the opposite sides of the ducts 8 are preferably bent outwardly at such an angle that they rest upon and engage the sides of the grooves in partition 14 substantially to seal the zone of communication between the ducts and the slotted openings in the partition. Fresh air is adapted to be supplied to the heat transfer device and to the space beneath the partition 14. As shown in Fig. 1, fresh air which is supplied to the conduit 17 is forced by means of the fan 18, driven by motor 19, into the space or compartment 20 between the partition 14 and the preferably curved bottom closure 21 of the casing 1. The air passes upwardly through the slotted openings 15 in the partition 14 and thence through the ducts 8 of the heat exchange device to the hood 12 from which it may then pass to the hot-air delivery duct.

The products of combustion from the heating plant are adapted to flow downwardly between the ducts and heat the air passing upwardly therethrough. In the embodiment illustrated, the side wall 5 of the casing 1 is provided adjacent its upper end with an opening 22 therein. A duct 23 is adapted to be fastened over opening 22 through which it communicates with the spaces within the casing 1 and between the ducts therein as indicated at 24. The duct 23 is adapted, at its other end, to communicate with the heating plant and pass the products of combustion therefrom to the heat exchange device. These products will flow into the casing 1 adjacent its upper end and thence downwardly through the spaces 24 to the lower end of the casing. As illustrated in Fig. 1, side wall 2 of casing 1 is provided with an opening therein above the partition 14. In communication with this opening is fastened a conduit 25 in which is mounted a fan 26 which may be driven by the motor 19 as illustrated. The fan 26 is designed to draw the products of combustion downwardly through the heat exchange device and pass them through the conduit 25 to a suitable disposal place which may constitute a sewer.

In accordance with my invention and in order to provide a heat transfer device in which the ducts may be easily and thoroughly cleaned to preserve its high efficiency, a plurality of said ducts and preferably alternate ducts are mounted on a removable wall of the casing 1. As illustrated in Fig. 7, a plurality of alternate ducts such as ducts 8a are supported on the side wall 5 of the casing while ducts 8b may be supported on the side wall 2 of the casing. With this construction, the nuts 7 may be removed from bolts 6 and the wall 5 removed from the casing thereby withdrawing the ducts 8a from between the ducts 8b. Thorough cleaning of the exterior of these ducts may then be accomplished and, thereafter the casing may be readily reassembled. In the embodiment shown, the hood 12 and plate 10 at the upper end of the casing may be vertically shifted sufficiently to permit withdrawal of the ducts 8a but, of course, a close sliding fit between the upper ends of the ducts 8a and the upper closure of the casing 1 may be effected.

As shown in Fig. 7, a bar 51 for closing the ends of the slots 15 in partition 14 may be secured to side wall 5. The side of bar 51 lies adjacent the downwardly diverging sides of the ducts 8a and the top edge thereof lies adjacent the bottoms of the end walls of said ducts. When the wall 5 of the casing is fastened in position, bar 51 will abut the partition 14 and effect a closure of the ends of the slotted openings 15 therein.

To facilitate the proper insertion of the ducts 8a within the casing 1 and to insure fairly uniform spacing between the ducts, the wall 2 of the casing is preferably provided with guide members 27 which extend generally longitudinally thereof and substantially conform in shape to the shape of the ducts 8a. These guides are positioned between the ducts 8b and are adapted to receive and position the ducts 8a when inserted therein. Of course, the side wall 5 may likewise be provided with similar guide members to engage the ducts 8b.

It is to be observed that in the heat exchange device of my invention, the ducts are so arranged that the air flows upwardly therethrough while the products of combustion flow downwardly through the casing. As heat transfer takes place through the walls of the ducts, the products of combustion cool and condensation of moisture therein occurs. In my invention, I have provided means for removing the condensate which may collect within the heat exchange device and, in the embodiment illustrated, grooves 16 in the partition 14 are employed for this purpose. It will be noted from an inspection of the drawings that the grooves 16 extend between the ducts 8 and are arranged to discharge condensate which may collect therein upon a lip 28 with which the partition 14 is preferably provided and which may extend exteriorly of the casing 1 as illustrated in Fig. 1. The bottom of the duct 25, hereinbefore described, which communicates with the opening in casing 1 above the partition 14, may slope slightly downwardly from adjacent the base of the lip 28 to a depression 29 therein. The depression also preferably slopes downwardly from both sides of the duct toward the central portion thereof to which a pipe 30 is connected. Condensate which collects in the grooves 16 flows therefrom over the lip 28 and to the depression 29 from which it is discharged through pipe 30. A screen or strainer 31 may be provided over the inlet to pipe 30 to prevent clogging; and a clean-out opening 32 may be provided in the side of duct 25.

It will be noted from the foregoing description of my heat exchange device that, briefly, a flow of fresh air upwardly through the ducts thereof is promoted by means of the fan 18 and that the undulating or tortuous configuration of the ducts produces a highly efficient heat transfer from the products of combustion to the air. A downward flow of the products of combustion is promoted by the fan 26 and, due to this arrangement, these products may be discharged into a sewer. Furthermore, any condensation products in the heat exchange device may be discharged therefrom through the pipe 30 provided for this purpose.

An exemplary installation of my air conditioning system is shown in Fig. 8 wherein a building structure 33 is illustrated as comprising a room 321 and a cellar 331 which contains the heating plant and ducts or conduits of the system. The heating plant comprising the usual combustion and air heating chambers is indicated at 34. To the heating plant is connected the hot-air delivery duct 35 and the cold air return duct 36. These ducts, at their other ends communicate through registers 37 and 38, respectively, with the room 32. A stack or duct 23 for removing the products of combustion from the heating plant 34 communicates therewith and with the upper end of the heat exchange device 1. The duct 13 for heated fresh air communicates with the top of the heat exchange device 1 and with the hot-air delivery duct 35. Fresh air may be taken from the exterior of the building structure and passed through the duct 17 to the heat exchange device adjacent the bottom thereof; and the products of combustion may be discharged through the duct 25 which may be connected to a sewer.

Preferably, a suitable connection is made between the cold air return duct 36 and the stack 23 as by means of the duct indicated at 40. The duct 40 is provided to remove some of the foul air from the air conditioning system which, of course, is replaced by the heated fresh air from the heat exchange device.

While I have described my invention in its preferred embodiments, it is to be understood that the words which I have used are words of description rather than of limitation. Hence, changes within the purview of the appended claims may be made without departing from the true scope and spirit of my invention in its broader aspects.

What I claim is:

1. A heat-exchange device comprising a casing provided with a plurality of narrow ducts defining passages extending lengthwise of said casing with the sides of said ducts in closely spaced relationship, the sides of said ducts being formed of comparatively thin metal whereby to provide high heat conductivity, said ducts being adapted to pass air upwardly therethrough and the spaces within said casing and between said ducts being adapted to pass hot products of combustion downwardly therethrough, said casing having a base member therefor provided with openings therein adapted to register with the ends of said ducts, and said member having grooves disposed between the openings therein and communicating with the exterior of said casing for the discharge of condensate from said casing, and alternate ducts being withdrawable from between the other ducts in said casing.

2. A heat-exchange device comprising a laterally closed casing having one side wall movable bodily and laterally relative to the other walls thereof and means for fastening said movable side wall in casing-closing position, a plurality of narrow ducts defining passages extending lengthwise of said casing with the sides of said ducts in closely spaced relationship, said ducts having an undulating configuration in a lengthwise direction and the sides thereof being formed of comparatively thin metal whereby to provide high heat conductivity, and said ducts being adapted to pass air in one direction therethrough while the spaces within said casing and between said ducts being adapted to pass hot products of combustion in the opposite direction therethrough, and alternate ducts being mounted on said movable side wall of said casing and movable therewith as a unit, and the other ducts being supported on the opposite wall thereof whereby said movable side wall may be laterally moved to withdraw the ducts mounted thereon as a unit from said casing to facilitate cleaning of the exteriors thereof.

3. A heat-exchange device comprising a laterally closed casing having one wall movable relative to the other walls thereof and means for fastening said movable wall in casing-closed position, a plurality of narrow ducts defining passages extending lengthwise of said casing with the sides of said ducts in closely spaced relationship, the sides of said ducts being formed of comparatively thin metal whereby to provide high heat conductivity, and said ducts being adapted to pass air in one direction therethrough while the spaces within said casing and between said ducts being adapted to pass hot products of combustion in the opposite direction therethrough; alternate ducts being mounted on said movable wall of the casing and movable therewith as a unit whereby said movable wall may be moved to withdraw alternate ducts from between other ducts for cleaning purposes, said other ducts being mounted within and relatively fixed within said casing, and said casing being provided with guide means for spacing said ducts when placed in side by side relation within the casing.

4. A heat-exchange device comprising a laterally closed casing having one wall movable relative to the other walls thereof and means for fastening said movable wall in casing-closing position, a plurality of narrow ducts defining passages extending lengthwise of said casing with the sides of said ducts in closely spaced relationship, the sides of said ducts being formed of comparatively thin metal whereby to provide high heat conductivity, and said ducts being adapted to pass air in one direction therethrough while the spaces within said casing and between said ducts being adapted to pass hot products of combustion in the opposite direction therethrough; a plurality of said ducts being mounted on said movable wall of the casing and movable therewith as a unit out of said casing for cleaning purposes and other ducts being mounted in relatively fixed relation to said plurality of ducts in said casing; the ducts mounted on the movable wall of the casing being movable between the ducts mounted in said casing and lying therebetween when said movable wall lies in casing-closing position.

ZIMRI H. BUSH.